United States Patent Office 2,745,686
Patented May 15, 1956

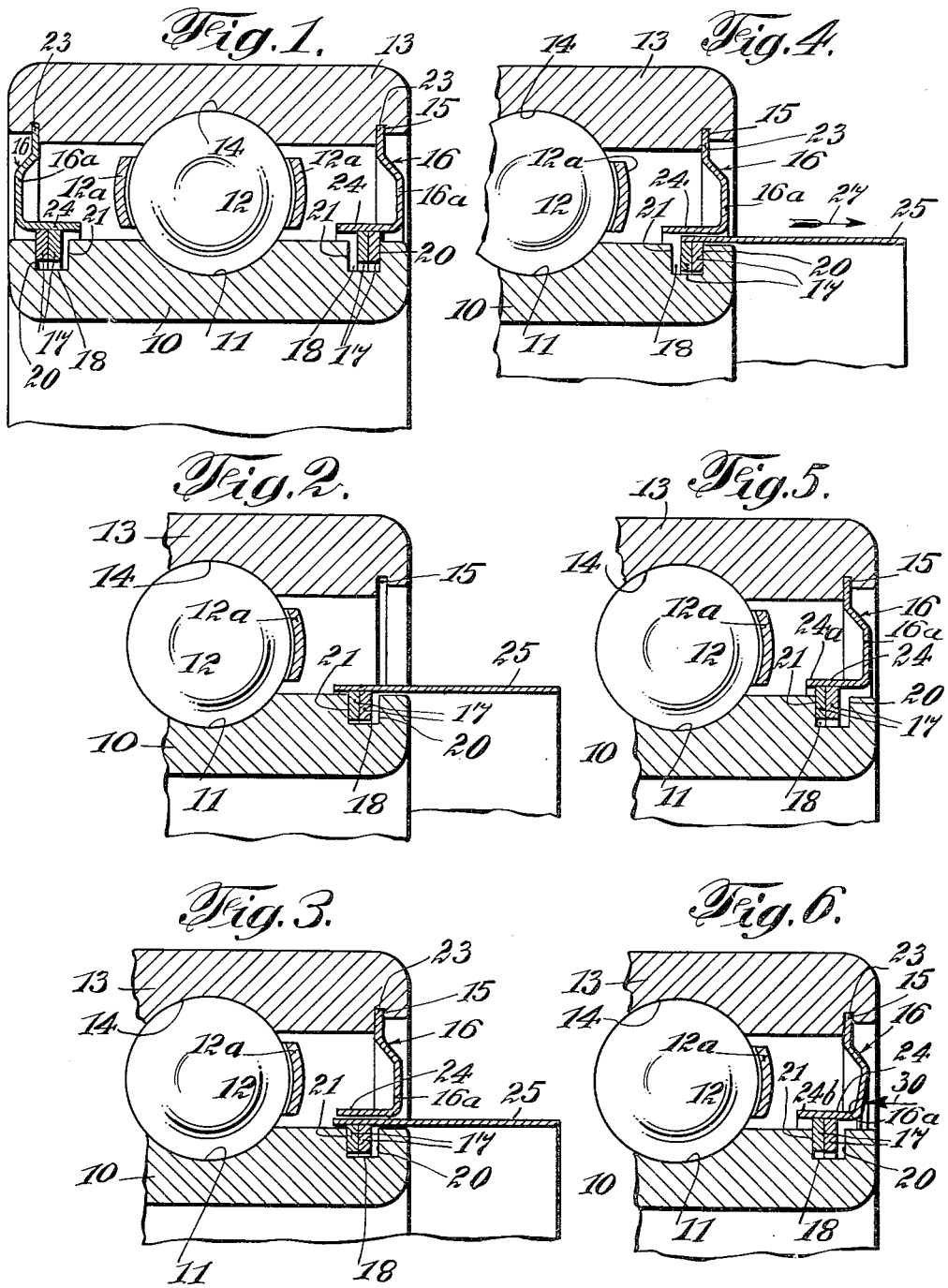

2,745,686

BEARING SEALS

Warren D. Anderson, Glenbrook, Conn., assignor to Norma-Hoffman Bearings Corporation, Stamford, Conn., a corporation of New York Application September 23, 1952, Serial No. 310,987

1 Claim. (Cl. 286—5)

This invention relates to anti-friction bearings of the ball or roller type, and more particularly to that type in which dust barriers are utilized to keep foreign bodies out of the rolling members.

While it has heretofore been proposed to use split rings for completing dust barriers between the outer and inner race rings, this invention contemplates an improvement thereover.

Bearings of this general type must not only meet the problem of dust or dirt exclusion but must be of a kind which may be mass produced.

Extremely severe conditions exist in the use of bearings in coal mines, cement plants, etc., where considerable saturation of the atmosphere with dust particles of various sizes prevails. Dust particles find their entry into bearings, and render them less efficient than the original specification required.

The invention consists in locating a compressed split ring depending in a circumferential groove of the inner race ring opening radially outwardly towards the outer race ring, and extending axially from an inner part to an outer shoulder, so that one surface of the split ring is as close as possible to said outer shoulder, allowing however for a clearance to prevent friction between said parts during the rotation of the bearing, and yet prevent the entry of foreign products into the bearing, said split ring pressing upon a horizontal cylinder forming a bore of an annulus extending from the outer race ring towards said inner race ring. Due to manufacturing variables, the split ring extending into said groove requires a freedom of movement axially of said groove. Attempts to position the split ring in any position in said groove distant inwardly from said outer shoulder of said groove failed to solve the problem. By shifting of the split ring to a position as close as possible to said outer shoulder under the guidance of the concept of this invention, the solution of the problem was made manifest.

The invention includes a novel method of locating the split ring in the groove as close as possible to the outer shoulder of said groove, and maintaining that location, and a novel means embodying the invention for excluding foreign matter from entry into the bearing.

The invention will be further described, embodiments thereof shown in the drawings and the invention will be finally pointed out in the claim.

In the accompanying drawings,

Fig. 1 is a transverse section of an anti-friction ball bearing, to which the improvement has been applied;

Fig. 2 is a partial section of said ball bearing, showing steps of assembling the parts entering into the improvement;

Fig. 3 is a similar section showing the further steps in assembling the parts shown in Fig. 2;

Fig. 4 is a similar section showing still further steps of the form shown in Figures 2 and 3, which steps when completed, result in the form shown in Fig. 1;

Fig. 5 is a similar section but showing alternative steps of assembling the parts entering into the improvement; and Fig. 6 is a similar section showing steps subsequent to those shown in Fig. 5, the end result of the steps of Figures 5 and 6, being shown in Fig. 1.

Similar characters of reference indicate corresponding parts throughout the views.

Referring to the drawings, an example of a known ball bearing is shown in all of the drawings. The invention is equally applicable to self contained roller bearings, of the type which provide for axial location of the inner race relative to the outer race. The inner race ring 10 has a race 11 for the balls 12, and the outer race ring 13 has a like race 14. A cage 12a is shown. Known also is a groove 15 in the outer race ring 13, for the insertion of an annulus or dust barrier 16, for securing it to the outer race ring.

To answer the demands of mass production, a groove 18 is elongated to facilitate its making by the ordinary cutting or grooving tools.

The circumferential groove 18 in the inner race ring 10 for the insertion of disk split ring 17 has a width greater than the thickness of at least one split ring, if only one be used, and greater than the aggregate widths of two contiguous split rings, if two be used. The axial length of the cylinder 24 is slightly greater than the axial length of the groove 18. When two split rings are used, as in the preferred construction shown in the drawings, the gaps of the same are phased in respect to each other. Particular attention is called to this elongated groove, which allows for many positions of the split ring or split rings.

The improvement consists in co-relating the annulus 16 with the split ring 17, so that at all times during the operation of the bearing, the split ring 17 while being pressed radially outwardly against the cylinder 24 of the annulus 16, is located closely adjacent to the outer shoulder 20 of the groove 18 and away from the inner shoulder 21 of the groove 18, or away from any intermediate position. This locating of the split ring at the outer shoulder is an important part of the concept of the invention.

Research in dust box tests under the guidance of the new concept herein disclosed has shown that when the split ring 17 is located as closely adjacent as possible to the outer shoulder 20 of the groove 18 with a sufficiently small clearance between the outer face of the split ring 17 and the outer groove shoulder 20 to prevent the entry of dust particles, without however invoking friction or wear between said split ring and said outer shoulder, then a very efficient dust or dirt or other foreign matter protection results.

One manner of carrying out the present invention is to insert the disk split rings 17 (two being shown in the drawings though only one may be used) loosely into the groove 18, as shown in Fig. 2, and then applying a thin tubular sleeve 25 over the outer circumferential surface of the split rings 17 to compress the same radially inwardly to a smaller outer diameter substantially equal to the inner diameter of the tube 25, with the bores of the split rings spaced from the bottom of the groove (see Figs. 2 to 4). An annulus or barrier 16 is then inserted, its outer periphery 23 entering the groove 15 of the outer race ring 13, periphery 23 being locked in the groove 15. The position of the annulus or barrier 16 is shown in Fig. 3 having its horizontal cylinder 24 substantially parallel with the sleeve 25, and slightly spaced therefrom. The split rings 17 are disposed at the inner shoulder 21. If the split rings happen to be in any intermediate position between the shoulders 21 and 20, the sleeve 25 when enveloping the split rings will usually push the split rings over towards or against the inner shoulder 21 of the groove 18. The sleeve 25 is then moved axially outwardly, as shown by the arrow 27 (Fig. 4), and the split rings 17 are moved by the sleeve 25 from whatever position they may be in, to a position as close as possible to the outer shoulder 20 of the groove 18.

The sleeve 25 is then entirely withdrawn from the split rings. The split rings then expand radially and press against the inner surface of the cylinder 24 of the annulus 16 (Fig. 1), the split rings being in the position where the outer surface of the outer split ring is contiguous to the outer shoulder 20. The split rings then remain in a position closely adjacent to the outer shoulder 20 and with such a small clearance between the outer side of the outer split ring 17 and shoulder 20 as to inhibit the entry of dust, dirt, etc. The final position of the split ring 17 in relation to the outer shoulder 20 is shown in Fig. 1.

The principle underlying this invention is the placing of a split ring upon the cylinder part of the annulus shown in such a position that the close clearance between the outer face of said outer split ring and the outer shoulder of the groove is assured, and maintained during the operation of the bearing. The resilience of the split ring 17 provides a holding force on the cylinder 24 of the annulus 16, to retain the selected position described.

The same result may be carried out, by first assembling the annulus 16 and split rings 17 in a bearing (Fig. 5), with the rings 17 in any position in respect to the inner end of the groove. In the embodiment of Fig. 5, the inner shoulder 21 is shown, distant from said outer shoulder 20, the inner face of the inner split ring 17 being contiguous to the inner shoulder 21 of the groove 18. The annulus 16 with its cylinder 24 is then subjected to an inward elastic deflection by a force applied to it as shown by the arrow 30 in Fig. 6, to move the cylinder 24 of the annulus 16 axially inwardly to slide over the split rings from the position of the annulus 16 shown in Fig. 5, where the cylinder 24 protrudes very little, as shown by 24a, beyond the inner split ring inwardly thereof, to the position of the cylinder 24 as shown in Fig. 6, where the cylinder 24 protrudes inwardly over the inner split ring a longer distance, as shown by 24b. When the annulus and split ring are so disposed to each other (as shown in Fig. 6), then the force of deflection 30 is discontinued and the inherent resiliency of the annulus 16 causes the annulus 16 to spring back to its original position, and the cylinder 24 to move with it, which cylinder 24 moves the split rings, to a position contiguous to the outer shoulder 20, so that when the inner ring 10 of the bearing is rotated there will be a clearance just sufficient to prevent ingress of dust, or the like, but insufficient to create a harmful friction between the outer face of the outer split ring and its contiguous outer shoulder 20 of the groove 18, as shown in the final position of the parts shown in Fig. 1. The sleeve 25 and the cylinder 24 have the same function, namely, shifting the split rings from any inner position to a position contiguous to the outer shoulder 20.

There has been described a seal assembly in an antifriction bearing comprising an inner ring, an outer ring, and interposed rolling elements, the seal consisting of a metal annulus fastened to the outer ring and a split ring partially filling an exterior groove of the inner ring and compressed into the bore of the cylinder of the annulus; the steps of assembling the seal comprising (a) assemble the split ring into the groove, (b) to assemble a thin tubular sleeve over the split ring, (c) to assemble the sheet metal annulus over the sleeve and to fasten the sheet metal annulus to the outer ring, (d) to withdraw the tubular sleeve in an axial direction, moving the split ring in the groove actually outwardly, thus leaving the split ring located adjacent to the outer shoulder of the groove.

Also there has been described a first assembly of the split ring into the groove, an assembly of the sheet metal annulus with its cylinder over the split ring and a fastening of the annulus to the outer ring, and also the method according to which the inner portion of the annulus is subjected to an elastic deflection in an axial direction inwardly to an extent greater than the clearance between the split ring and the groove so that when the annulus is allowed to return toward its initial position, the split ring will be moved with the annulus and will be located adjacent to the outermost side of the groove. In other words, this alternative method teaches to assemble the split ring into the groove; to assemble the sheet metal annulus over the split ring and hold the annulus against the outer ring while deflecting the inner portion of the annulus in an axial direction inwardly to an extent greater than the clearance between the split ring and the inner end wall of the groove, so that when the annulus is allowed to return toward its initial position, the split ring will be moved with it and be located adjacent to the outer shoulder of the groove.

Whatever embodiment is used, the underlying principle or method is to locate one surface of the split ring in the groove in such close lateral relationship to the outer shoulder of the groove, as to constrict said entrance sufficiently to impede or prevent the entry of any dust, etc. without friction or wear of said parts and to maintain said relationship during the operation of said bearing, while the expanding force of the compressed split ring presses against the annulus cylinder.

Grease or oil is used with anti-friction bearings and this grease or oil may enter the space between the outer shoulder of the groove and the closely adjacent outer surface of the split ring, whereby the clearance referred may be grease filled.

The words "split ring" may be construed as either a single split ring or a multiple grouping, in which latter case the ends of each split ring are disposed out of phase. The split ring is a flat disk with a cut out, whose thickness is considerably less than its radial depth and considerably less than the length of the groove 18. In all embodiments, the contact of the split ring 17 with the groove 18, is only at the contiguous sides of one surface of the split ring and inner surface of the outer shoulder, all of the remaining part of the split ring being entirely free, excepting for the outer contacting surface of the split ring with surface of the cylinder 24 of the annulus 16.

In respect to the article, described and shown, I wish it to be understood that I do not desire to be limited to the exact details of construction shown and described, for obvious modifications will occur to a person skilled in the art, but only by the scope of the appended claim.

I claim:

In a seal for an antifriction bearing having an inner race member and an outer race member, said inner race member having an annular groove in its outer peripheral surface in the proximity of one axial end thereof, said groove being defined by an outer shoulder and a cylindrical peripheral surface extending axially inwardly from said shoulder, and said outer race member having a bore facing said outer peripheral surface of said inner race member and an annular recess in said bore; the combination of an annular retaining member having a substantially radial portion with its outer periphery anchored in said recess in said outer race member and a substantially cylindrical flange extending in parallelism with said outer peripheral cylindrical surface of said inner race member and from said axial end thereof over said groove in said surface, and forming a cylindrical bore, said flange having an inherent resiliency with respect to said radial portion, and an expanded split ring within said bore of said cylindrical flange engaging said flange by its inherent resiliency for rotational movement therewith, said ring extending into said groove in said inner race member and being of a width substantially less than the width of said peripheral cylindrical surface, the outer lateral surface of said split ring being in immediate dustproof proximity of said outer shoulder in said groove and the inner lateral and the inner peripheral surfaces of said split ring being spaced axially from the inner end of said groove and from said cylindrical peripheral surface in said groove, respectively.

References Cited in the file of this patent

UNITED STATES PATENTS

| | | |
|---|---|---|
| 1,722,489 | Bott | July 30, 1929 |
| 1,895,167 | Lighthall | Jan. 24, 1933 |
| 1,991,077 | Brittain | Feb. 12, 1935 |
| 2,110,864 | Batesole | Mar. 14, 1938 |
| 2,266,407 | Bruestle | Dec. 16, 1941 |
| 2,574,323 | Flowers | Nov. 6, 1951 |